Dec. 6, 1938.    C. P. POTTER    2,138,821
GAME APPARATUS
Original Filed March 5, 1936    2 Sheets-Sheet 1

Inventor
C. P. Potter
by J. Edw. Maybee
ATTY

Dec. 6, 1938.  C. P. POTTER  2,138,821
GAME APPARATUS
Original Filed March 5, 1936  2 Sheets-Sheet 2
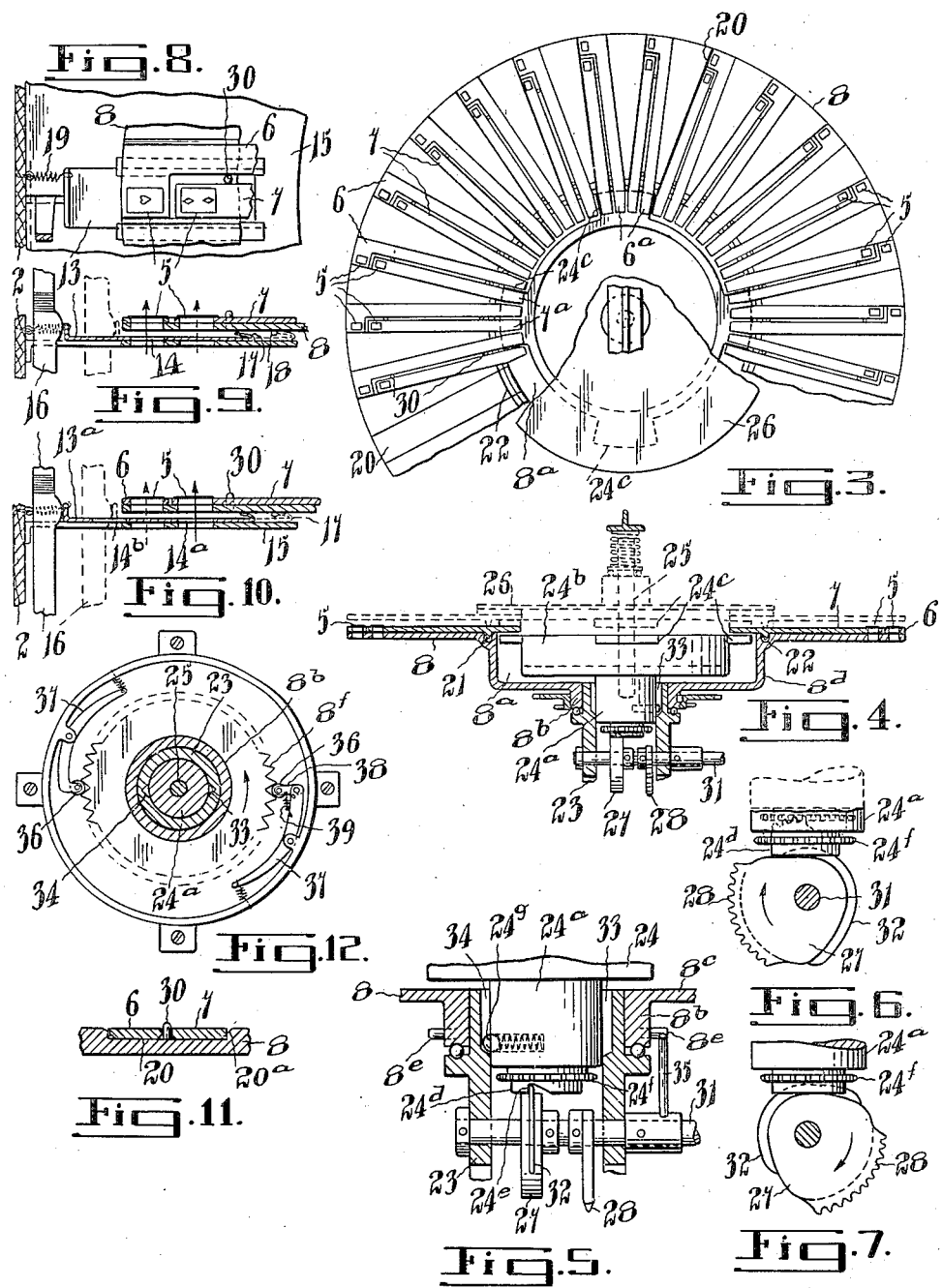
Inventor
C. P. Potter
by J. Edw. Maybee
ATTY.

Patented Dec. 6, 1938

2,138,821

UNITED STATES PATENT OFFICE 2,138,821

GAME APPARATUS

Charles P. Potter, Toronto, Ontario, Canada

Application March 5, 1936, Serial No. 67,335. Renewed May 11, 1938. In Great Britain March 6, 1935

10 Claims. (Cl. 88—27)

This invention relates to apparatus which may be operated in accordance with the rules of different games, such as those using playing cards, dominoes, dice or other devices, in which the relative values of combinations of various hands determine the winners and losers, and my object is to provide apparatus whereby the spinning of members bearing indicia representing the game being played presents different "hands" to a plurality of players; whereby the arrangement of the indicia bearing members may be previously varied; whereby a player may change the constituents of his "hand" without preknowledge of the effect of the change as in the game of poker; or whereby the "hands" as originally presented or as changed may be projected optically onto a suitable screen.

I attain my object by providing a casing with a top having a translucent image receiving screen or screens on which the images of the indicia may be optically projected from within the casing so that they may be seen when looking down on to the top thereof. Preferably the top is provided with groups of glazed openings or screens, one group for each player and the number of separated screens in each group being equal in number to the indicia or images constituting a "hand" in the game being simulated. For convenience, the apparatus will be described as used to play poker in which a "hand" comprises five ordinary playing cards. Beneath the top are located the members bearing the indicia which are adapted to be optically projected on to the screen or screens but not all at one time. Preferably, two series of members are employed with their indicia arranged in two concentric series, the indicia on one member in each series being located below each of the said separated screens or glazed openings. Means is provided for optically projecting the images of the indicia below each screen on to that screen and for cutting out the image of either of said indicia so that only one image appears at a time. If a player desires to "draw" he may cut out the image originally projected and cause the other image to be shown on said screen. During a shuffle, a certain number of the members bearing indicia in each series are shifted relative to the other members in the two series, and then all the members are shifted relative to the screens.

Figure 1:
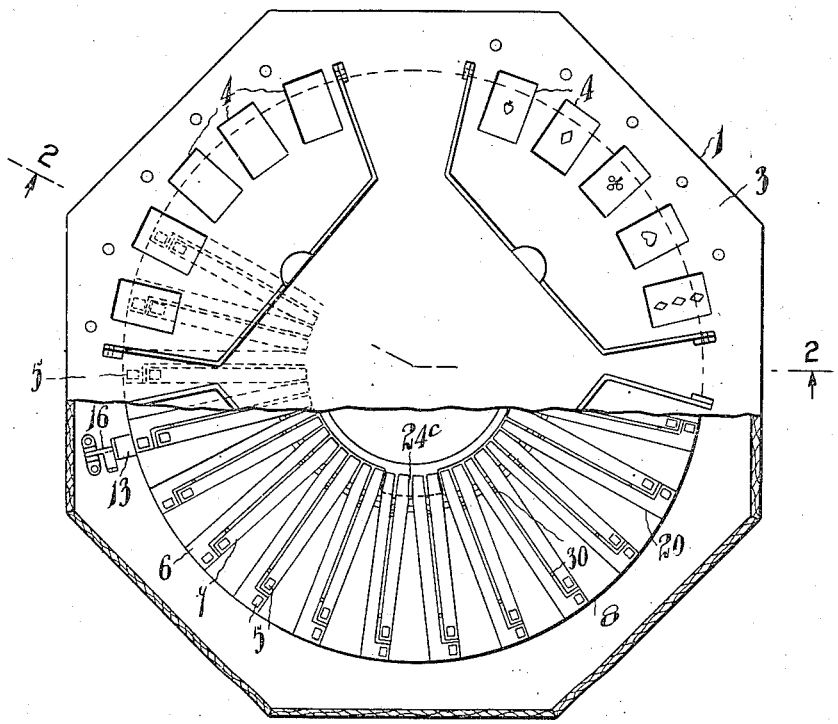
Figure 2:
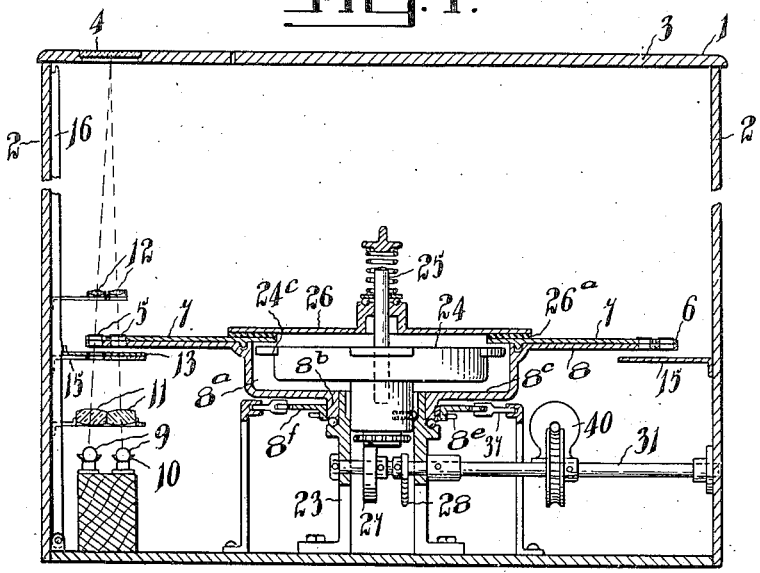

The constructions are hereinafter more fully described and are illustrated in the accompanying drawings in which Fig. 1 is a plan view of my apparatus, partly broken away to show the mechanism beneath the casing top;

Fig. 2 a cross-section on the line 2—2 in Fig. 1;

Fig. 3 a plan view of part of the rotating table;

Fig. 4 a cross-section of the parts shown in Fig. 3;

Fig. 5 a detail in cross-section on an enlarged scale of some of the parts shown in Fig. 4 after a certain number of the indicia carrying members have been shifted relative to the other of said members and showing the means for spinning the table to spin all the members;

Fig. 6 a detail showing the means for raising the clamping means to clamp a certain number of the indicia carrying arms and to turn them relative to the other arms;

Fig. 7 a view similar to Fig. 6 but showing the clamping and turning means at the end of its stroke;

Fig. 8 a detail in plan on an enlarged scale, of the indicia carrying arms, table and shutter;

Fig. 9 a sectional view of the parts shown in Fig. 8, showing the indicia on a plate in the outer series being conditioned for projection, the indicia on an inner plate being adapted to be conditioned for projection upon the shifting of the shutter if a draw is desired;

Fig. 10 a view similar to Fig. 9, the indicia on an inner plate in this case being conditioned for projection and the indicia on an outer plate being adapted to be conditioned for projection upon the shifting of the shutter if a draw is desired;

Fig. 11 a cross-section detail of two arms in a groove of the table; and

Fig. 12 a detail showing the means for properly positioning the table at the end of its spinning movement so that the indicia will be in register with the screens.

1 is a casing of any desired shape but which is provided with sides 2 and a top 3 for enclosing the hereinafter described mechanism. The top 3 is provided with one or more image receiving screens or glazed openings. If the apparatus is to be used to play poker, the openings or screens 4 will be arranged in groups of five around the top 3, one group for each player.

Indicia carrying members comprising plates 5 (which bear the indicia or images) and radially directed arms 6, 7 (which carry the plates) are arranged in two series below the openings 4. Preferably these series are concentrically arranged to form inner and outer series, the plates are formed of transparent material such as glass or film material, and the indicia or images represent playing cards. The arms 6, 7 are normally supported on a table 8″, in lieu thereof.

The arms 6 carry the plates in the outer series and beside each of the arms 6 is one of the arms 7 which carry the plates in the inner series. The two plates in different series carried by each pair of arms 6, 7 are substantially in radial alignment and the circumferential distance between the plates on adjacent pairs of arms equals the circumferential distance between the openings 4 in each group thereof. While the groups of openings 4 may be segregated as shown, the distance between the closest openings in adjacent groups must be such that the plates will register simultaneously with all the openings around the top 3.

The indicia on either one of the plates 5 below each glazed opening 4 is adapted to be optically projected so that the projected images will overlap one another. That is, the projected images will be in the same position on the screen so that the projected images before each player will always be in line to facilitate the reading of the "hand". Any suitable projecting apparatus comprising a source of light 9, a reflector 10, a condenser 11 and a focusing lens 12 may be used. As only one image is projected at a time on each glazed opening 4, any suitable means may be employed to cut out the other image. Preferably, a shutter 13 is used to prevent the illumination of the other indicia by its projecting apparatus (see Figs. 2, 8, 9 and 10).

Some of the shutters 13 are provided with single openings 14 which are normally in register with the plates 5 in the outer series and are adapted to register with the plates 5 in the inner series when the shutters are shifted radially towards the center of the table 8. The other shutters 13$^a$ are each provided with two spaced openings 14$^a$, 14$^b$, the openings 14$^a$ being normally in register with the plates 5 in the inner series. When any one of the shutters 13$^a$ is shifted radially towards the center of the table, the opening 14$^b$ in each shutter uncovers the plate in the outer series and that portion of the shutter between the openings 14$^a$ and 14$^b$ covers the card in the inner series. The shutters 13, 13$^a$ may be slidably mounted on brackets 15 secured to the sides 2 of the casing 1. Each shutter is adapted to be moved by a coin-controlled lever 16 and is locked after the first image is projected. The locking means may comprise a spring tongue 17 on each shutter which passes under a keeper 18 on the underside of the table 8 and engages the keeper to prevent an outward movement of the shutter until after the table has been moved as hereinafter described. A spring 19 is adapted to return the shutter to its normal position.

From the above description, it is obvious that the indicia on some of the transparent plates 5 will be optically projected on to the glazed openings 4 and that any number of the projected images may be changed by shifting one or more of the shutters 13.

The plates or transparencies 5 are shuffled in the following manner. The top of the table 8 is provided with a number of radial grooves 20, one for each pair of arms 6, 7. Each of said arms is provided with a pin 21 adapted to be received in a circular recess 22 formed in the table top. Grooves 20 in the table position the arms radially thereof. The central portion of the table 8 is formed as a well 8$^a$ and has a hub 8$^b$ journalled in a standard 23. The bottom 8$^c$ and vertical sides 8$^d$ of the well connect the hub 8$^b$ with the grooved table top 8. The inner ends 6$^a$, 7$^a$ of the arms 6, 7 project inwardly past the sides 8$^d$ of the well 8$^a$ so that any one or more of said ends may be engaged by a clamping member 24 which is vertically movable within the well. The clamping member comprises a cylindrical portion 24$^a$, which is rotatably and slidably mounted in the upper end of the standard 23. A cup shaped portion 24$^b$ carried by the portion 24$^a$ is free to move axially and rotarily in the well 8$^a$. The clamping jaws 24$^c$ extend radially from the cup portion 24$^b$ for engagement with a certain number of the ends 6$^a$, 7$^a$. The portion 24$^b$ carries a stud 25 on which a clamping disk 26 is journalled and axially movable. The disk may be provided with a resilient surface 26$^a$ and is spring-actuated to normally engage all the arms 6, 7 to tend to retain them in their grooves 20.

Referring to Fig. 3, it will be noted that four jaws 24$^c$ are provided and that each jaw is adapted to engage two ends 6$^a$, and two ends 7$^a$ whereby sixteen of the arms 6, 7 will be clamped between the jaws 24$^c$ and the disk 26 when the clamping member 24 is raised by the cam 27. The latter is adapted to cause the clamping means 24$^c$, 26 to raise the engaged arms above the level of the other arms on the table 8 and to hold them in their raised position while the clamping means is rotated by means of a segmental gear 28 which meshes with a gear 24$^f$ on the underside of the cylindrical portion 24$^a$. After the clamping means and the arms carried thereby have been turned a portion of a revolution, the cam 27 lowers the arms into fresh grooves 20 and moves the jaws out of the path of the ends 6$^a$, 7$^a$. The sides of the grooves are chamfered as shown at 20$^a$ in Fig. 11 to facilitate the entry of the shifted arms in the fresh grooves. The entry of the pins 21 in the recess 22 will re-position the arms correctly radially of the table. Tapered pins 30 arranged longitudinally of the grooves to lie between the arms therein will re-position the arms in each groove so that they will be properly positioned circumferentially of the table, see Figs. 3 and 11.

The cam 27 and segmental gear 28 are secured to a shaft 31 which may be driven in any manner by a coin-controlled device. Preferably the said device controls the operation of an electric motor 40 which is adapted to turn the shaft one revolution each time a coin is deposited. The cam 27 engages a boss 24$^d$ on the underside of the cylindrical portion 24$^a$ and the boss is provided with a number of shoulders 24$^e$ any one of which may be engaged by a fin 32 carried by the cam to prevent any turning of the clamping means while it is being raised by the cam and to prevent any overrunning of the gripping members. The shoulders 24$^e$ will be spaced apart to correspond to the turning angle of the clamping means which is, of course, controlled by the number of teeth in the segmental gear 28. To ensure proper registration of the shifted arms with the fresh grooves, the portion 24$^a$ is provided with a spring-actuated ball 24$^g$ which normally engages a keyway 33 in the standard 23 and is adapted to engage another keyway 34 when the segmental gear disengages the gear 24$^f$, which is carried by the boss 24$^d$.

A further shuffle is effected by spinning the table 8 with all the arms 6, 7 thereon after some of them have been shifted relative to the others as hereinbefore described. This spinning movement is imparted to the table by a finger 35 carried by the shaft 31 and adapted to engage any one of a number of pins 8$^e$ carried by the table hub 8$^b$. The finger 35 engages a pin 8$^e$ just before the shaft completes its movement and the table is spun until it comes to rest. Of course, successive spinning movements imparted to the table will vary due to the variations in relative position of the finger 35 to the pin which it will engage and therefore a fresh set of plates would be positioned before each player even if some of the arms were not shifted before the table is spun.

With my double shuffling, the "hands" for each player would be changed on successive "deals" even if the plates, which were not changed by shifting the arms relative to one another, did happen to be returned to a player.

To ensure the plates being properly positioned relative to the projecting apparatus and to the screens or glazed openings 4 when the table 8 comes to rest, I provide a serrated wheel 8ᶠ carried by the hub 8ᵇ and spring-actuated means for engaging the serrations. The said means comprises diametrically opposite rollers 36 (see Fig. 12) carried on spring-actuated arms 37, the rollers being adapted to lie within the serrations. One of said rollers is journalled on a finger 38 pivoted on one of said arms and provided with a spring 39 whereby the finger will be moved relative to the arm to draw the wheel into proper meshing engagement with the other roller if it happens to be resting on the point of a serration.

The mode of operation is as follows. Upon a coin being deposited the motor 40 is energized to rotate the shaft 31, one revolution. This causes the clamping means to be raised, turned a portion of a revolution and lowered whereby some of the arms 6, 7 are shifted relative to the other arms. The table is then spun and when it comes to rest, each player will have ten plates 5 positioned beneath the five glazed openings 4 in front of him but only the indicia on five plates will be optically projected. If each player desires to draw one to five new representations of cards, he may do so upon depositing a coin for each draw and each coin will operate or permit of the operation of one of the levers 16. By operating any one of the levers, its shutter 13 or 13ª will be shifted to substitute a fresh plate 5 for the one having its indicia projected.

The player having the best "hand" at the end of the draw wins and the game may continue by depositing a fresh coin to obtain a fresh deal. Any shutter 13, 13ª which is locked by a keeper 18, after a draw has been made, will be released immediately the table is again turned on the next deal so that each lever 16 may effect a draw during the playing of the next "hand". It will be noted that the plates are continuously changed and intermixed on each deal and not merely shifted back and forth from one position to another.

It will be distinctly understood that various modifications may be made without departing from the spirit of my invention. For instance, only one lens 12 may be employed below each glazed opening 4 and it may be carried on a slide so that the indicia on each of the plates below any screen may be optically projected thereon, one at a time, to effect a draw. Instead of having the plates 5 beneath each opening arranged radially in two series, they may be arranged circumferentially and each carried on an arm having a separate groove 20 in the table 8. It is also obvious that the indicia in the two described series might be spaced at a considerable distance from one another and yet have their projected images overlapping one another.

What I claim as my invention is:

1. In game apparatus the combination of a projection screen; a support located beneath the screen; a plurality of indicia carrying members on said support, the screen and support being movable relative to one another in substantially parallel planes for varying the positions of the indicia relative to the screen; optical projecting apparatus including a source of illumination and lenses arranged in suitable positions so that images of all the indicia may be projected upon the screen without changing the position of the support and screen relative to one another; and manually operable means initially permitting the simultaneous display of images of a given number of the indicia and preventing the display of, at least, a similar number of the other indicia, the said means being operable to substitute on the screen an initially undisplayed image for any one of the initially displayed images without changing the relative position of the screen and support.

2. In game apparatus, the combination of a projection screen; a support located beneath the screen; a plurality of indicia carrying members interchangeably carried on the support, the screen and support being movable relative to one another in substantially parallel planes for varying the positions of the indicia relative to the screen; means movable relative to the support for changing the positions of a number of indicia carrying members on the support relative to the other members to vary the arrangement of the indicia; optical projecting apparatus including a source of illumination and lenses arranged in suitable positions so that images of all the indicia may be projected upon the screen without changing the relative positions of the support and screen; and manually operable means initially permitting the simultaneous display of images of a given number of indicia and preventing the display of, at least, a similar number of the other indicia, the last mentioned means being operable to substitute on the screen an initially undisplayed image for any one of the initially displayed images without changing the relative position of the screen and support.

3. In game apparatus, the combination of a rotary support; a plurality of indicia carrying members interchangeably carried on the support, the members being arranged in two series and each indicia being carried on one of the said members; means movable relative to the support for changing the position of a number of the indicia carrying members on said support relative to the other members; a projection screen; projection apparatus including illuminating means and lenses arranged in suitable positions so that images of each of said series of indicia may be projected upon the screen without changing the position of the indicia; and manually operable means initially permitting the simultaneous display of a number of images of indicia in each series and preventing the display of, at least, a similar number of the other indicia, the last mentioned means being operable to substitute on the screen an initially undisplayed image of an indicia in one series for any one of the displayed images of indicia in the other series without turning the support.

4. In game apparatus, the combination of a rotary disk; a plurality of pairs of removable indicia carrying radial arms releasably held on the disk, indicia arm shifting and clamping means in said disk for shifting a number of the arms relative to the other arms; a projection screen; projection apparatus including illuminating means and lenses arranged in suitable positions so that images of all the indicia may be projected upon the screen without changing the position of the support; manually operable means for permitting the simultaneous display of a number of images of indicia on one of each pair of arms and preventing the display of, at least, the indicia on the other of each pair of arms, the last mentioned means being operable to substitute on the screen an initially undisplayed image of an indicia on one arm for any one of the initially displayed images of indicia on the other arm of each pair of arms without affecting the other initially displayed indicia.

5. In game apparatus the combination of a rotary supporting disk; indicia carrying members interchangeably supported on said disk in concentric relation thereto, the indicia forming two series; a projection screen; optical projecting apparatus including a source of illumination and lenses suitably positioned for projecting images of the indicia on the screen; means movable relative to the disk for simultaneously changing the circumferential position of a plurality of the indicia carrying members relative to the others; and a plurality of manually operable shutters, each shutter being adapted to display an indicia in one or the other of the two series on the screen and simultaneously to inhibit the visibility of the other indicia in the other of said series, each shutter being adapted when moved to inhibit the visibility of any one of the originally displayed indicia of either series and to simultaneously display an indicia of the series other than that in which the originally displayed indicia is contained, without moving the rotary disk and without affecting the visibility of any of the other indicia.

6. In game apparatus, the combination of a rotary support; a plurality of series of removable indicia carrying radial arms releasably held on the support, the indicia being carried on the arms of each series; vertically movable rotary means in said support including spaced apart gripping members adapted to grip and lift a number of the arms above the support, turn the lifted arms relative to the other arms, lower the lifted arms on to the support in a place vacated by different lifted arms, and release the lifted arms so that the indicia carried thereby will be shifted relative to the indicia carried by the other arms; optical projecting means including a source of illumination and suitably positioned lenses for projecting images of a plurality of indicia in areas upon a screen simultaneously, the projected images of the indicia on one series of arms being adapted to overlap the projected images of the indicia on another series of arms, the support and the arms being adapted to be moved together relative to the projecting means and independently of the movement imparted to some of the arms by the aforesaid vertically movable rotary means so that different areas of indicia will be projected on successive operations of the apparatus; and means for controlling the visibility of projected images in the areas to render any one or more of the originally visible images invisible and simultaneously render a corresponding number of the originally invisible images visible, the said controlling means being adapted to permit a player to substitute an originally invisible image for each undesired originally visible image while the support is at rest.

7. In game apparatus, the combination of a rotary table; two series of removable indicia carrying radial arms releasably carried on the table, the indicia being carried on the arms of each series, the table having a central well over which the inner ends of the arms project; vertically movable rotary means in the table comprising gripping members having substantially equally spaced apart jaws normally positioned in the well for engagement with the undersides of the inner ends of a predetermined number of the arms and having a clamping disk for engaging the upper sides of the arms; means beneath the table for raising the jaws to clamp the inner ends of the arms engaged thereby against the disk; means for turning the jaws relative to the table a distance equal to the spacing apart of the jaws so that the arms carried thereby will be positioned over grooves in the table top from which different arms were removed, the raising means being adapted to lower the jaws to position the arms into their new grooves and to position the jaws below the undersides of the arms; optical projecting means including a source of illumination and suitably positioned lenses for projecting images of a plurality of indicia in areas upon a screen simultaneously, the projected images of the indicia on one series of arms being adapted to overlap the projected images of the indicia on the other series of arms; and means for preventing the projection of at least half the total number of images which could be projected from the two series of indicia and simultaneously permitting the projection of images of the other indicia, the said means also being manually operable while the table is at rest to cut out the images which were originally projected and to simultaneously permit the projection of the images which were originally undisplayed so that a fresh image may be substituted for any undesired image originally projected upon the screen, without affecting the desired original images.

8. In game apparatus, the combination of a rotary support; two series of removable indicia carrying radial arms releasably carried on said support, the indicia being carried on the arms of each series, each indicia on one series of arms being paired with indicia on the other series of arms; vertically movable rotary means in said support including spaced apart gripping members adapted to grip and lift a number of the arms above the support, turn the lifted arms relative to the other arms, lower the lifted arms on to the support in a place vacated by different lifted arms, and release the lifted arms so that the indicia carried thereby will be shifted relative to the indicia carried by the other arms; a projection screen; means for rotating the support to turn it relative to the screen; optical projection means, including a source of illumination and suitably positioned lenses for simultaneously projecting images of not more than one of each pair of indicia; and means for blocking at least half the total number of images which could be projected from the two series of indicia, the screen being formed with spaced apart display areas so that only a predetermined number of the remainder of the indicia will be simultaneously displayed in different areas on the screen, the said blocking means also being adapted while the support is at rest to block any undesired originally projected image in either series and to simultaneously display the originally blocked image in the other series which is paired with the undesired originally projected image, so that a fresh image may be substituted for each undesired image originally projected upon the screen, without affecting the display of the other images.

9. A game closely simulating a type of card game in which each of a plurality of players is permitted to discard and draw fresh cards, comprising a projection screen; rotatable supporting means; a plurality of interchangeable members carrying indicia and releasably held on said supporting means; means movable relative to the support for changing the positions of the indicia carrying members relative to one another on said support; optical projecting means, including a source of illumination and lenses suitably arranged for projecting a plurality of indicia in different areas on the screen, one area for each player; and means for discarding or removing the undesired projected images of any indicia from any area of the screen and for simultaneously drawing and displaying an image of a fresh indicia so that the latter is substituted for the former while the support is at rest, so that any one or all of the playing positions or areas may be caused to display both initially projected and substituted images without moving the support and without affecting any other images in the areas.

10. A game closely simulating a type of card game in which each of a plurality of players is permitted to discard one or more of those cards originally dealt to him and to draw a fresh card for each of those discarded, comprising a projection screen having a plurality of playing positions indicated thereon, one for each player; a support located beneath the screen; a plurality of indicia carrying members on said support, the members being arranged in two series, the screen and indicia carrying members being relatively movable in substantially parallel planes for varying the positions of the indicia relative to the playing positions on the screen; optical projecting apparatus including a source of illumination and lenses arranged in suitable positions so that images of each of said series of indicia may be projected in different playing positions on the screen while the support is at rest; and a plurality of manually operable means for permitting the initial display of a number of images in each series in each playing position and for preventing the display of, at least, a similar number of the other indicia, the last mentioned means being operable independently of one another to substitute on the screen an initially undisplayed image of an indicia in one series for any one of the displayed images of indicia in the other series without affecting the other initially displayed indicia.

CHARLES P. POTTER.